United States Patent
Richardson

(10) Patent No.: US 7,606,337 B2
(45) Date of Patent: Oct. 20, 2009

(54) ENHANCING SIGNALS

(75) Inventor: Michael Richard Richardson, Romsey (GB)

(73) Assignee: BAE Systems plc, London (GB)

( * ) Notice: Subject to any disclaimer, the term of this patent is extended or adjusted under 35 U.S.C. 154(b) by 438 days.

(21) Appl. No.: 10/521,747

(22) PCT Filed: Nov. 19, 2004

(86) PCT No.: PCT/GB2004/004905

§ 371 (c)(1), (2), (4) Date: Jan. 19, 2005

(87) PCT Pub. No.: WO2005/053191

PCT Pub. Date: Jun. 9, 2005

(65) Prior Publication Data

US 2005/0250451 A1 Nov. 10, 2005

(30) Foreign Application Priority Data

Nov. 21, 2003 (GB) .................................. 0327041.0

(51) Int. Cl.
*H03D 1/00* (2006.01)
(52) U.S. Cl. ........................ 375/343; 375/150; 375/254; 375/346; 375/267
(58) Field of Classification Search ................. 455/63.1, 455/456; 375/267
See application file for complete search history.

(56) References Cited

U.S. PATENT DOCUMENTS

| 5,675,581 | A | 10/1997 | Soliman |
| 5,974,087 | A | 10/1999 | Nowara |
| 6,288,675 | B1 * | 9/2001 | Maloney ..................... 342/457 |
| 6,650,906 | B1 * | 11/2003 | Bousquet et al. ............ 455/522 |
| 7,359,431 | B2 * | 4/2008 | Kwon et al. ................. 375/150 |
| 2003/0017832 | A1 * | 1/2003 | Anderson et al. ........... 455/456 |
| 2003/0020653 | A1 | 1/2003 | Baugh et al. |

FOREIGN PATENT DOCUMENTS

EP        0 893 703 A1        1/1999

* cited by examiner

*Primary Examiner*—Shuwang Liu
*Assistant Examiner*—Lihong Yu
(74) *Attorney, Agent, or Firm*—Scully, Scott, Murphy & Presser, PC

(57) ABSTRACT

Described herein is a method of enhancing signals received by a receiver in a mobile telecommunications network. The method comprises correlating the received signals to produce a correlation and making a selection from the correlation to create a replica for enhancing the received signals.

12 Claims, 3 Drawing Sheets

ENHANCING SIGNALS

The present invention relates to enhancing signals in a mobile telecommunications network.

Base stations are adapted to operate in specific environments having local infrastructure, for example, buildings, and other environmental factors (including geographical features such as terrain and trees). The local infrastructure and environmental factors are known to give rise to perturbations in the transmission of signals. These perturbations can take the form of errors in the received signals, and signal degradation may occur during the transmission of any signals due to signal attenuation, multi-path reflection, multi-path dispersion, background noise or as a result of cross talk from adjacent cells. All these effects reduce the efficiency and performance of the telecommunications cell.

In order to overcome these effects, it is useful to determine the propagation characteristics of a cell within a mobile telecommunications network so that compensation can be made for the specific environment of each cell in the network, for example, to enhance the signal-to-noise (S/N) ratio within that cell.

In accordance with one aspect of the present invention, there is provided a method of enhancing signals in a mobile telecommunications system, the system comprising a base station and first and second receivers within a reception zone of the base station, the method including:

a) receiving a plurality of first signals at the first receiver, the first receiver having good quality communication link with the base station;

b) receiving a plurality of second signals at the second receiver;

c) correlating the received signals from both receivers to provide an estimated correlation therefor;

d) selecting areas from within the estimated correlation;

e) creating a replica of unwanted signals using said selection and said plurality of first signals; and f) enhancing said plurality of second signals by eliminating said replica therefrom.

Preferably, the estimated correlation comprises a correlation of propagation delay and frequency shift for the received signals.

Additionally, step f) includes correlating said enhanced plurality of second signals with said plurality of first signals to produce an enhanced correlation. The enhanced correlation may comprise a correlation of propagation delay and frequency shift for the enhanced plurality of second signals and the plurality of first signals.

For a better understanding of the present invention, reference will now be made, by way of example only, to the accompanying drawings, in which.

The present invention relies on correlation being made in both time and frequency domains between a plurality of signals received at a first and a second receiver from the same base station. These signals can be referred to as first receiver signals and second receiver signals. As both receiver signals tend to have good auto-correlation properties, that is, having a large main peak at zero relative delay and low side lobes elsewhere (not shown), it is possible to resolve components of the received signals in terms of their amplitudes, time delays, frequency shifts and phase shifts with respect to the first receiver signal. It is therefore possible to categorise unwanted signals in terms of relative time delay (propagation delay) and frequency shift. The signal components that fall into the unwanted category can be identified by their propagation delay and frequency shift characteristics, and good estimates with respect to the first receiver signal can be obtained. These estimates are then used in conjunction with the first receiver signal to create replica signals of the signals corresponding thereto. The replica signals are then subtracted from the second receiver signals to remove the unwanted signals. This has the effect of substantially reducing the unwanted signals so that a final correlation with the first receiver signal enhances the detection of the required signals.

Figure 1:
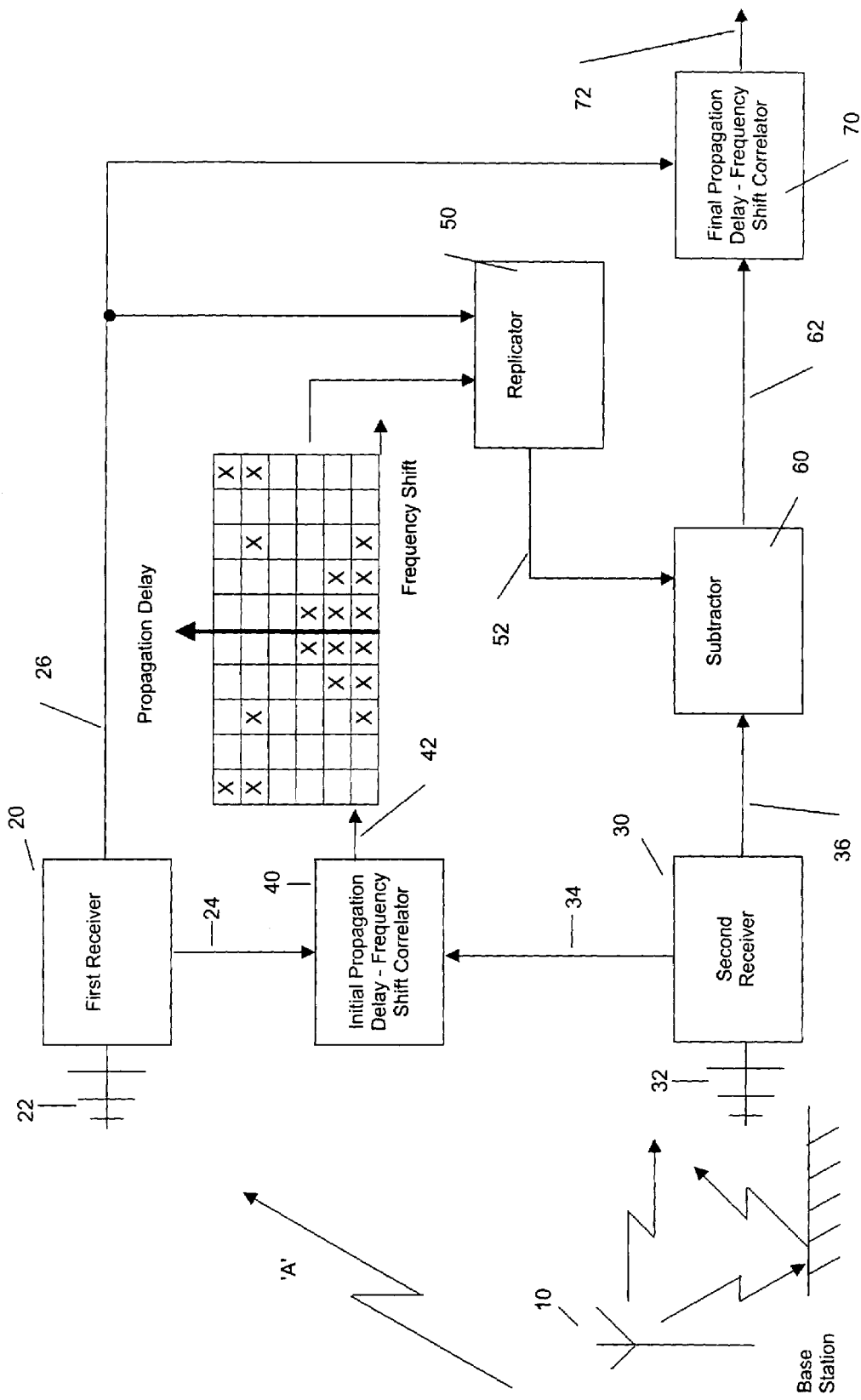
FIG. 1 illustrates a block diagram of a system for determining propagation characteristics in accordance with the present invention.

Referring now to FIG. 1, a base station 10 located in a cell (not shown) is shown together with a first receiver 20 and a second receiver 30. The first receiver 20 is positioned in the cell to have a direct line-of-sight with the base station 10 as indicated by arrow 'A'. Whilst it is necessary for the first receiver 20 to have a good quality communication link with the base station 10, this is not the case for the second receiver 30. Each receiver 20, 30 has a respective antenna 22, 32 for receiving signals from the base station 10. The good quality communication link can be achieved by using an elevated receiver, an antenna with direct gain, a line-of-sight propagation path, advanced signal processing techniques, other suitable methods, or combinations thereof.

Figure 2:
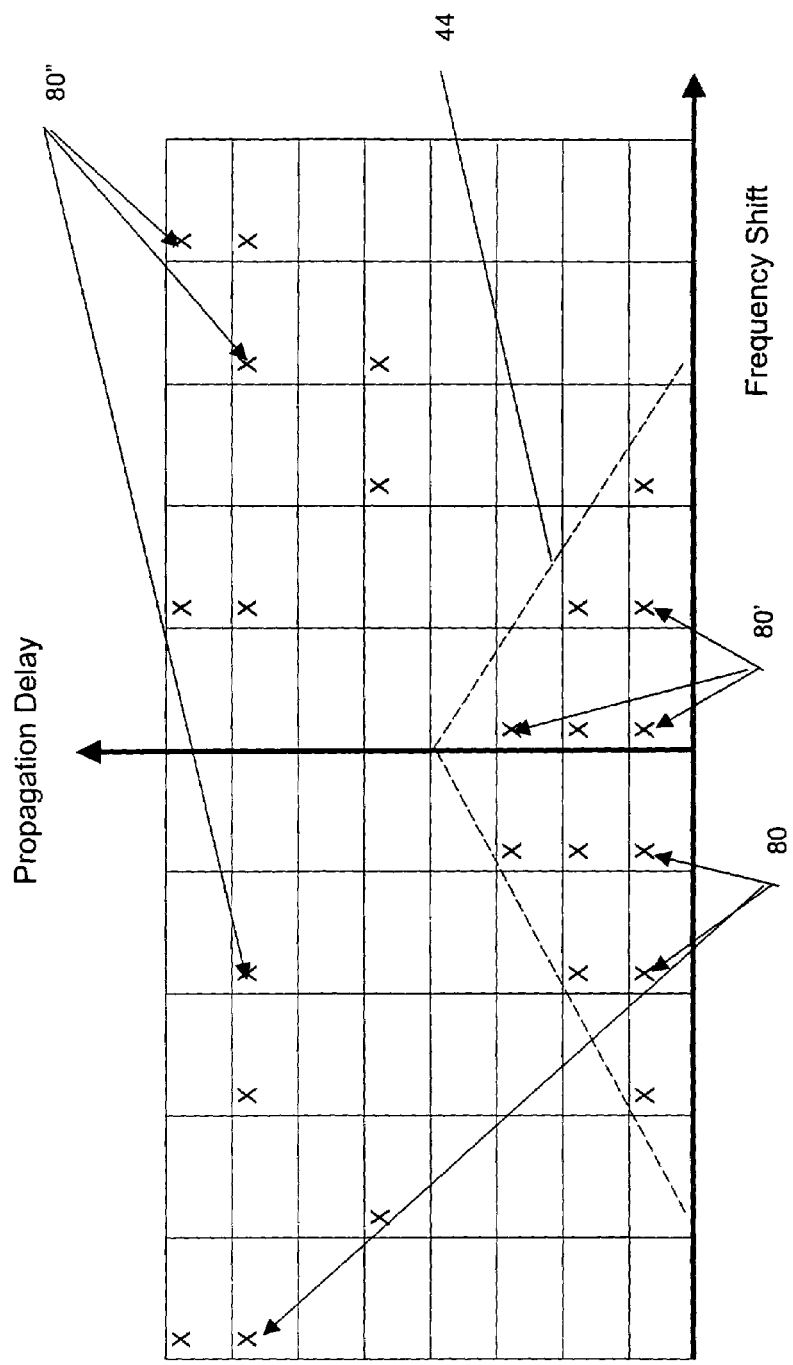
FIG. 2 illustrates an enlarged view of the output of the correlator shown in FIG. 1.

Each receiver 20, 30 is connected to a correlator 40 to correlate received signals 24, 34 therefrom. Output 42 from correlator 40 can be displayed as a plot of propagation delay against frequency shift for the received signals. An enlarged view of output 42 is shown in FIG. 2.

For illustrative purposes, crosses placed on the plot indicate signals that have been received and classified in terms of propagation delay, frequency shift, amplitude and phase relative to the first receiver signal.

A second output 26 from the first receiver 20, identical to output 24, is provided to a replicator 50 together with output 42. The replicator 50 creates a replica signal 52 based on a selection 44 (FIG. 2) made from the output 42. The replica signal 52 forms one input to a subtractor 60. The other input to the subtractor 60 is a second output 36 from the second receiver 30.

In the subtractor 60, the replica signal 52 is subtracted from the signals received at the second receiver 30 to provide subtracted output signal 62. Output signal 62 forms one of the inputs to a second correlator 70, the second output 26 from the first receiver 20 forming the second input.

Figure 3:
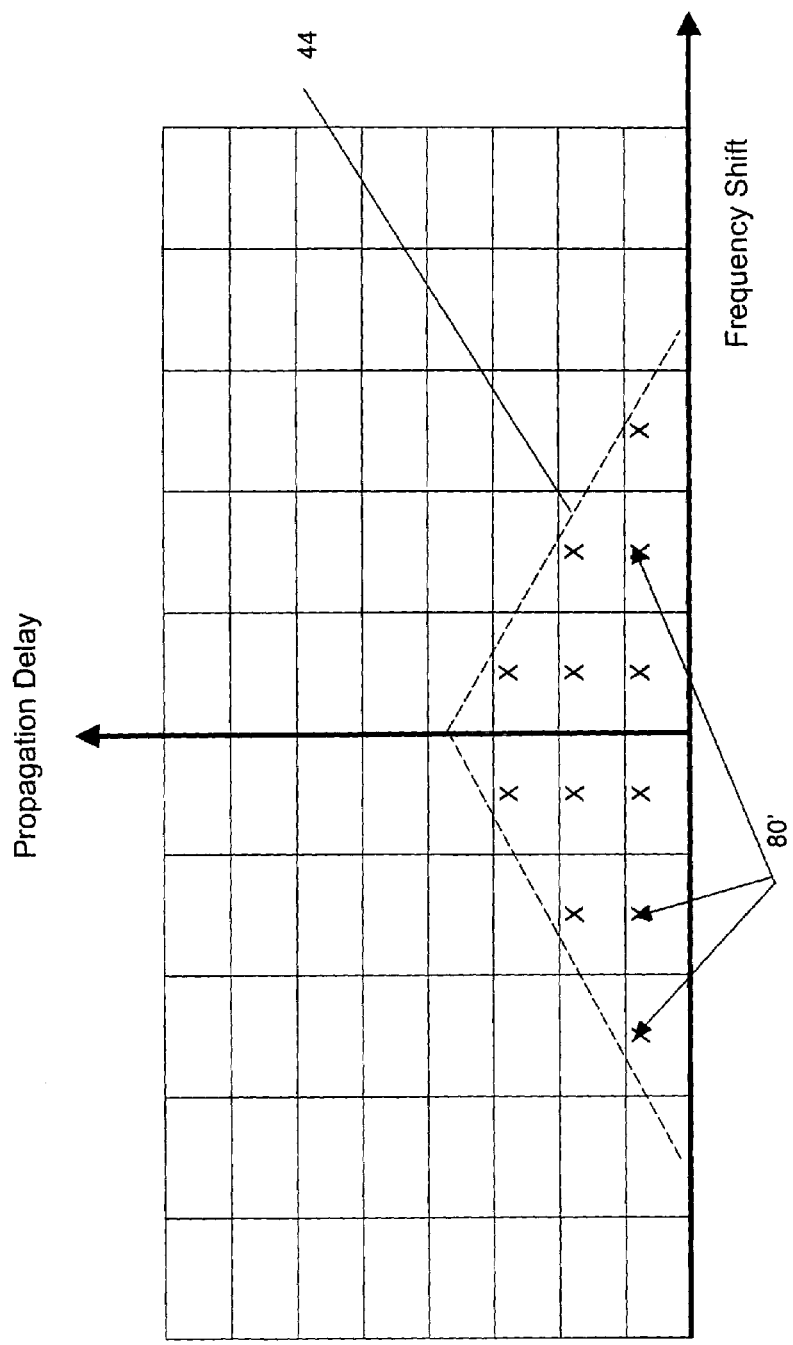
FIG. 3 is similar to FIG. 2 but with the selection enhanced.

Correlator 70 is identical to correlator 40 and correlates signals from the first receiver 20, output 26, and the subtracted output signal 62 from the second receiver 30 to provide output 72. Output 72 can be displayed in a similar way to output 42 but, as shown in FIG. 3, only selection 74 corresponding to selection 44 of FIG. 2 is enhanced. As a result, the selection 44 is enhanced.

Naturally, the output obtained can be tailored by the selection 44 (FIG. 2) and any other portion of the output 42 can be selected and used as the basis for the replica signal 52.

In FIG. 2, the output 42 is shown in more detail. Here, a number of signals 80 are present in the propagation delay/frequency shift domain. In this case, however, only signals 80' within selection 44 are of interest. Signals 80" are to be removed in the subsequent processing—these signals forming the basis of the replica signal 52. It will be appreciated that signals 80" may detract from the performance of the system.

In FIG. 3, only signals 80' remain after correlation of the output 62 and second output 26 from the first receiver 20 (FIG. 1).

It will be appreciated that the conceptual correlation processes in the time delay and frequency shift domains may be conveniently implemented in either the time or frequency signal processing domains, for example, by employing Fast Fourier Transform (FFT) processing as is well understood by those skilled in the art.

It will also be appreciated that the time delay correlation resolution is dependent on fundamental physical laws relating to the bandwidth and modulation characteristics of the signal in use and other factors such as system noise levels. The frequency resolution will essentially depend on the integration period applied during the received signal processing and other factors such as system noise levels. In additions, it will be appreciated that other resolution limits may be imposed in practice by such factors as the period over which the overall propagation and environmental conditions remain stable.

The invention claimed is:

1. A method of enhancing signals in a mobile telecommunications system, the system comprising a base station and first and second receivers within a reception zone of the base station, each of said first and second receivers operable with a dedicated antenna, both of said first and second receivers being connected to a correlator, the method including:
    a) receiving, from the base station, a first plurality of signals at the first receiver at a first location, the first receiver having a good quality communications link with the base station;
    b) receiving, from the base station, a second plurality of signals at the second receiver at a location separate from said first location;
    c) correlating the received signals from both receivers to provide an estimated correlation therefor;
    d) selecting areas from within the estimated correlation;
    e) creating a replica of unwanted signals using said selection and said first plurality of signals; and
    f) enhancing said second plurality of signals by eliminating said replica therefrom.

2. The method according to claim 1, wherein the estimated correlation comprises a correlation of propagation delay and frequency shift for the received signals.

3. The method according to claim 2, wherein step f) includes correlating said enhanced second plurality of signals with said first plurality of signals to produce an enhanced correlation.

4. The method according to claim 3, wherein the enhanced correlation comprises a correlation of propagation delay and frequency shift for the enhanced second plurality of signals and the first plurality of signals.

5. The method according to claim 1, wherein step f) includes correlating said enhanced second plurality of signals with said first plurality of signals to produce an enhanced correlation.

6. A method according to claim 5, wherein the enhanced correlation comprises a correlation of propagation delay and frequency shift for the enhanced second plurality of signals and the first plurality of signals.

7. A system for defining propagation characteristics of a cell within a mobile telecommunications network, the system comprising:
    a base station, a first receiver and second receiver within a reception zone of the base station, the first and second receivers each being associated with an antenna and both being associated with a correlator, said first receiver at a first location configured to receive a first plurality of signals from the base station on the mobile telecommunications network, said first receiver having a good quality communications link with the base station said second receiver at a second location separate from the first location configured to receive a second plurality of signals from the base station;
    means for generating an estimated correlation of the first and second pluralities of signals;
    means for selecting an area from within the estimated correlation;
    means for creating a replica of an unwanted signal using the selected area and the first plurality of signals; and
    means for enhancing the second plurality of signals by eliminating the replica of the unwanted signal therefrom.

8. The system according to claim 7, wherein the estimated correlation comprises a correlation of propagation delay and frequency shift for the first and second pluralities of signals.

9. The system according to claim 8, wherein the means for enhancing the second plurality of signals further includes means for correlating an enhanced second plurality of signals with the first plurality of signals to produce an enhanced correlation.

10. The system according to claim 9, wherein the enhanced correlation comprises a correlation of propagation delay and frequency shift for the enhanced second plurality of signals and the first plurality of signals.

11. The system according to claim 7, wherein the means for enhancing the second plurality of signals further includes means for correlating an enhanced second plurality of signals with the first plurality of signals to produce an enhanced correlation.

12. The system according to claim 11, wherein the enhanced correlation comprises a correlation of propagation delay and frequency shift for the enhanced second plurality of signals and the first plurality of signals.

* * * * *